United States Patent
Arakawa

(10) Patent No.: US 7,262,426 B2
(45) Date of Patent: Aug. 28, 2007

(54) METHOD, APPARATUS AND PROGRAM FOR IMAGE DATA CORRECTION

(75) Inventor: Satoshi Arakawa, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 75 days.

(21) Appl. No.: 11/149,218

(22) Filed: Jun. 10, 2005

(65) Prior Publication Data
US 2005/0274918 A1  Dec. 15, 2005

(30) Foreign Application Priority Data
Jun. 10, 2004  (JP)  ............................. 2004-172405

(51) Int. Cl.
- A61B 6/00 (2006.01)
- G01N 23/04 (2006.01)
- G01T 1/105 (2006.01)
- G03B 42/08 (2006.01)

(52) U.S. Cl. .................................... 250/584; 250/582

(58) Field of Classification Search ............... 250/582, 250/584
See application file for complete search history.

(56) References Cited

U.S. PATENT DOCUMENTS

| | | | | |
|---|---|---|---|---|
| 5,760,416 A | * | 6/1998 | Tsuchiya | .................... 250/584 |
| 5,981,968 A | * | 11/1999 | Nakazawa | .................. 250/587 |
| 6,313,477 B1 | * | 11/2001 | Yasuda et al. | .............. 250/587 |
| 2003/0178590 A1 | * | 9/2003 | Yasuda et al. | .............. 250/587 |

FOREIGN PATENT DOCUMENTS

| | | |
|---|---|---|
| JP | 64-86759 A | 3/1989 |
| JP | 1-99372 A | 4/1989 |
| JP | 9-239044 A | 9/1997 |

* cited by examiner

Primary Examiner—David Porta
Assistant Examiner—Frederick F. Rosenberger
(74) Attorney, Agent, or Firm—Sughrue Mion, PLLC

(57) ABSTRACT

Quality degradation of a radiograph obtained from a stimulable phosphor sheet used repeatedly for radiography can be suppressed by an image data correction apparatus. Light emission characteristic storage means stores light emission change characteristic data and section storage means stores a position and a range of each of areas in the sheet obtained by dividing the sheet. Cumulative radiation dose acquisition means obtains an accumulated radiation dose for each of the areas, and light emission change rate acquisition means finds a light emission change rate representing a change in an amount of emitted light in accordance with the accumulated radiation dose for each of the areas, by using the light emission change characteristic data. Correction means corrects a value of image data obtained by reading each of the areas, for the change in the amount of the light with reference to the light emission change rate.

6 Claims, 4 Drawing Sheets

METHOD, APPARATUS AND PROGRAM FOR IMAGE DATA CORRECTION

BACKGROUND OF THE INVENTION

1. Field of the Invention

The present invention relates to an image data correction method and an image data correction apparatus. More specifically, the present invention relates to an image data correction method and an image data correction apparatus for correcting image data read from a stimulable phosphor sheet used repeatedly for radiography. The present invention also relates to a program for causing a computer to execute the image data correction method.

2. Description of the Related Art

A radiography system using a stimulable phosphor (storage phosphor) is well known. A stimulable phosphor stores a part of energy of radiation emitted thereon, and releases the stored energy in the form of light in proportion thereto in response to exposure to a stimulating ray such as visible light. In a radiography system, an image of a subject such as a human body is recorded in a stimulable phosphor sheet, and the sheet is scanned with a stimulating ray such as a laser beam to cause the sheet to emit light. The light is then photoelectrically read to obtain an image signal, and a radiograph generated from the image signal is used for diagnosis. In the radiography system, a residual part of the radiation energy is released from the stimulable phosphor sheet by irradiation of the sheet with an erasing ray after the radiograph is read from the sheet. The stimulable phosphor sheet can then be used again for radiography.

In the radiography system, shading may be observed in the form of uneven density in the radiograph generated in the above manner, due to uneven scanning of the stimulable phosphor sheet with the stimulating ray or due to uneven detection of the light emitted from the sheet. Therefore, a method of measuring an effect of shading (Japanese Unexamined Patent Publication No. 1(1989)-099372) and a method of correcting shading (Japanese Unexamined Patent Publication No. 64(1989)-086759) are known.

Meanwhile, a light emission characteristic of a stimulable phosphor, comprising a stimulable phosphor sheet changes, due to repeated exposure to radiation for radiography. More specifically, a stimulable phosphor is altered by exposure to radiation, and the light emission characteristic (a characteristic in an amount of light emitted upon exposure to a stimulating ray of a predetermined condition from the sheet having been exposed to radiation of a predetermined dose) changes in proportion to an accumulated dose of radiation. Furthermore, in radiography described above, a center part of the sheet generally receives radiation having passed through a target and thus having weaker strength while a peripheral part of the sheet receives radiation not having passed through the target and thus having no change in the strength. Therefore, the dose of radiation increases in the peripheral part than in the center part. In addition, transmissivity varies from part to part in the target. Therefore, even in the center part of the sheet, the radiation exposure varies from point to point.

Consequently, a difference becomes larger in the accumulated dose of radiation between the center part and the peripheral part and among different points in the center part due to repeated radiography of various kinds of subjects. As a result, an amount of light emitted from each point becomes different even in the case where the sheet has received the same amount of radiation and has been exposed to the same amount of stimulating ray. Therefore, uneven density is observed in the image read from the sheet. In other words, uneven density is observed in the radiograph because the light emission characteristic becomes different between areas wherein the accumulated dose of radiation varies. The accumulated dose of radiation refers to a total amount of radiation the sheet has ever received. In the case where the amount of radiation on the sheet changes from point to point as has been described above, the accumulated dose of radiation varies from area to area in the sheet.

Especially, in the case where a stimulable phosphor sheet is used for radiography in a radiation therapy apparatus (such as an apparatus described in Japanese Unexamined Patent Publication No. 9(1997)-239044) for curing by exposing a lesion to radiation of a much larger dose, such as radiation of 1 million times the strength of diagnostic radiography, an amount of radiation on the sheet becomes larger even in a single radiography operation. Therefore, the change in the light emission characteristic becomes apparent in some cases even if the sheet has been used in radiography for a limited number of times.

SUMMARY OF THE INVENTION

The present invention has been conceived based on consideration of the above circumstances. An object of the present invention is therefore to provide an image data correction method and an image data correction apparatus for suppressing quality degradation of a radiograph obtained from a stimulable phosphor sheet used repeatedly for radiography, and to provide a program for causing a computer to execute the image data correction method.

An image data correction method of the present invention is a method for correcting image data representing a radiograph recorded in and read from a stimulable phosphor sheet used repeatedly in radiography. The image data correction method comprises the steps of:

preparing light emission change characteristic data representing a change, according to an accumulated dose of radiation on the stimulable phosphor sheet, in an amount of light emitted from the stimulable phosphor sheet having been exposed to a stimulating ray in advance;

obtaining an accumulated dose of radiation on each of areas in a light emission surface of the sheet;

finding a light emission change rate representing a change in the amount of the light in each of the areas corresponding to the accumulated dose of radiation thereon, by using the light emission change characteristic data; and correcting a value of the image data for each of the areas obtained by reading thereof, by counterbalancing the change in the amount of the light included in the image data, with reference to the light emission change rate.

An image data correction apparatus of the present invention is an apparatus for correcting image data representing a radiograph recorded in and read from a stimulable phosphor sheet used repeatedly in radiography. The image data correction apparatus comprises:

light emission characteristic storage means for storing light emission change characteristic data representing a change, according to an accumulated dose of radiation on the stimulable phosphor sheet, in an amount of light emitted from the stimulable phosphor sheet having been exposed to a stimulating ray;

section storage means for storing a position and a range of each of areas in the sheet obtained by dividing a light emission surface of the sheet;

cumulative radiation dose acquisition means for obtaining an accumulated dose of radiation in each of the areas;

light emission change rate acquisition means for finding a light emission change rate representing a change in the amount of the light in each of the areas corresponding to the accumulated dose of radiation thereof, by using the light emission change characteristic data; and correction means for correcting a value of the image data for each of the areas obtained by reading thereof, by counterbalancing the change in the amount of the light included in the image data, with reference to the light emission change rate.

A program of the present invention is a program for correcting image data representing a radiograph recorded in and read from a stimulable phosphor sheet used repeatedly in radiography. The program causes a computer to execute the steps of:

receiving information representing an accumulated dose of radiation in each of areas in the stimulable phosphor sheet obtained by dividing a light emission surface of the sheet;

finding a light emission change rate representing a change in an amount of light emitted from each of the areas in accordance with the accumulated dose of radiation by using light emission change characteristic data prepared in advance for representing a change, according to an accumulated dose of radiation on the sheet, in the amount of the light emitted from the stimulable phosphor sheet having been exposed to a stimulating ray; and correcting a value of the image data for each of the areas obtained by reading thereof, by counterbalancing the change in the amount of the light included in the image data, with reference to the light emission change rate.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

Each of the divided areas may be an area occupied by each pixel corresponding to the image data in the light emission surface of the stimulable phosphor sheet, or an area comprising a plurality of pixels. In the case where each of the areas is the area occupied by each pixel, a dose of radiation on each of the areas is a dose of radiation on the corresponding pixel. In the case where each of the areas is the area comprising the pixels, the dose of radiation in each of the areas is an averaged radiation dose on the pixels in the corresponding area.

The change in the amount of the light in accordance with the accumulated dose of radiation on the sheet refers to a change in the amount of the light emitted from the sheet upon exposure to a predetermined amount of stimulating ray after exposure to a predetermined dose of radiation on a stimulable phosphor in the sheet, and the change is caused by a difference in the accumulated dose of radiation on the sheet in the past (that is, before and after the exposure to the predetermined dose of radiation).

The stimulable phosphor comprising the stimulable phosphor sheet may be expressed by MeFX:$Eu^{2+}$ where Me includes at least one of Ba, Sr, and Ca while X refers to a halogenic composition including both Br and I.

In the stimulable phosphor expressed by MeFX:$Eu^{2+}$, reduction in the amount of the light according to the accumulated dose of X-rays becomes smaller in the case where X includes both Br and I than in the case where X includes only Br or I. Therefore, more accurate correction can be carried out if X includes both Br and I, since the change in the amount of the light becomes smaller. BaF($Br_{0.5}I_{0.5}$) $Eu^{2+}$ or BaF($Br_{0.85}I_{0.15}$) $Eu^{2+}$ can be used, as such a stimulable phosphor.

According to the image data correction method and the image data correction apparatus of the present invention, and according to the program of the present invention for causing a computer to execute the image data correction method, the light emission change characteristic data are prepared in advance, and the accumulated dose of radiation is obtained for each of the areas generated by dividing the light emission surface of the sheet. The light emission change rate representing the change in the amount of the light in accordance with the accumulated radiation dose in each of the areas is then found by using the light emission change characteristic data. The value of the image data obtained by reading each of the areas can be corrected by counterbalancing the change in the amount of the emitted light, with reference to the light emission change rate for each of the areas. Therefore, uneven density due to the difference in the accumulated radiation dose in the respective areas in the sheet can be reduced in the radiograph obtained by reading the sheet, which can suppress quality degradation of the radiograph.

DESCRIPTION OF THE PREFERRED EMBODIMENT

Figure 1:
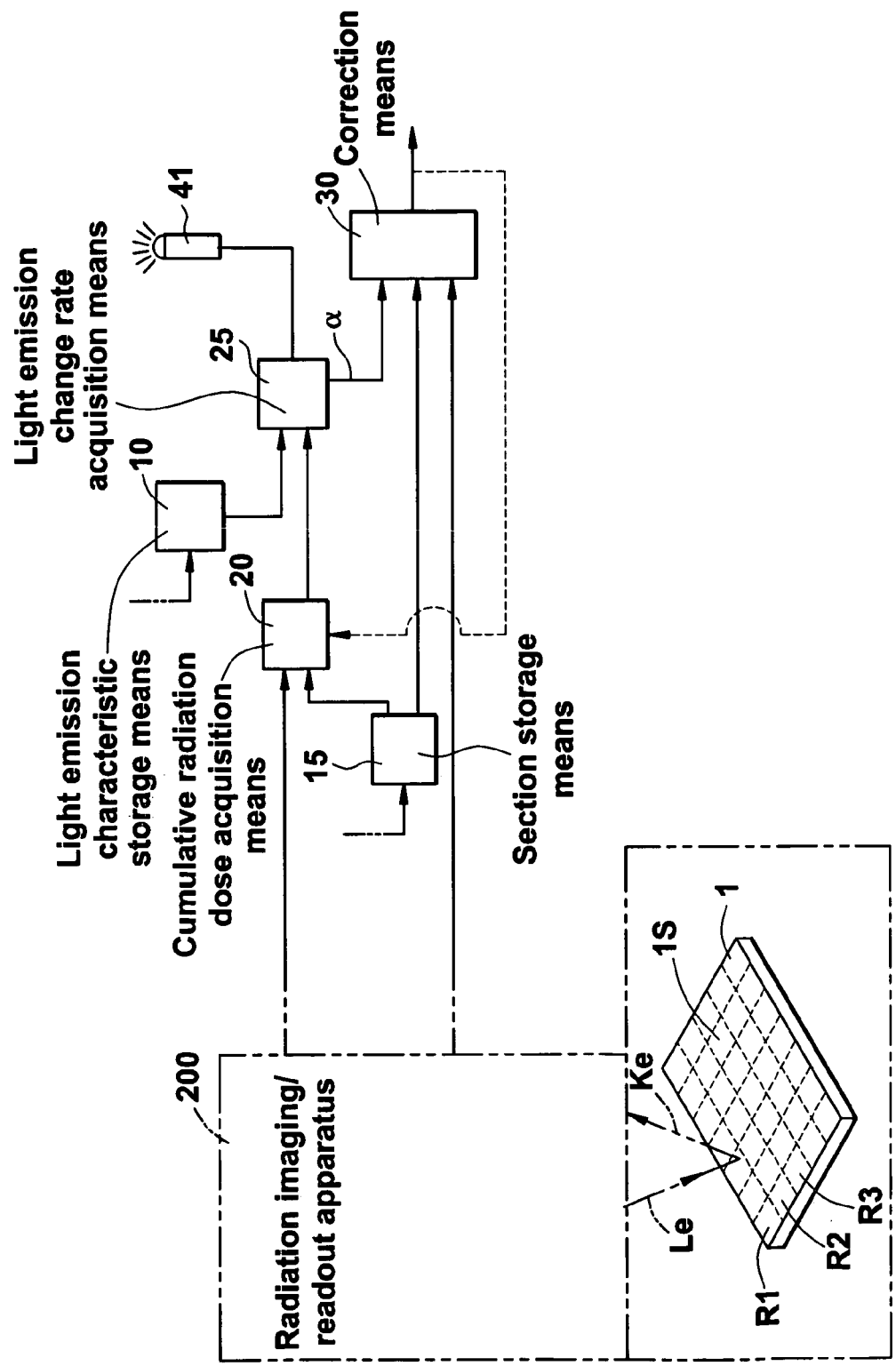
FIG. 1 shows the configuration of an image data correction apparatus of the present invention built in a radiation imaging reading apparatus.
Figure 2:
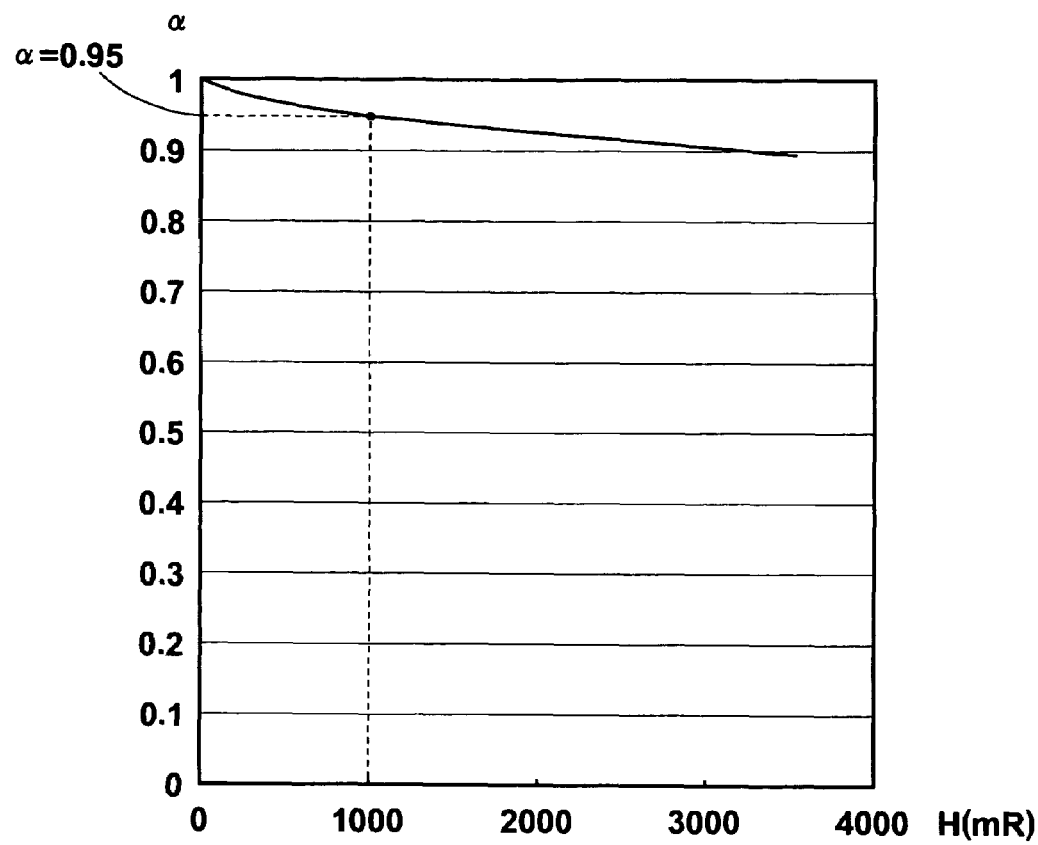
FIG. 2 shows a light emission change characteristic.

Hereinafter, an embodiment of the present invention will be described with reference to the accompanying drawings. FIG. 1 shows the configuration of an image data correction apparatus of an embodiment of the present invention that carries out an image data correction method, and FIG. 2 shows a change rate in an amount of emitted light.

An image data correction apparatus 100 shown in FIG. 1 corrects image data representing a radiograph recorded in and read from a stimulable phosphor sheet 1 that is used repeatedly for radiography.

The image data correction apparatus 100 comprises light emission characteristic storage means 10, section storage means 15, cumulative radiation dose acquisition means 20, light emission change rate acquisition means 25, and correction means 30. The light emission characteristic storage means 10 stores information on a light emission change characteristic representing a change in an amount of light Ke emitted from the stimulable phosphor sheet 1 having been exposed to a stimulating ray Le, in accordance with an accumulated dose of radiation on areas of the sheet 1 from which the light Ke is emitted. The section storage means 15 stores information on a position and a range of each of areas R1, R2, and so on obtained by dividing a light emission surface 1S of the sheet 1. The cumulative radiation dose acquisition means 20 obtains the accumulated radiation dose in each of the areas R1, R2 and the like. The light emission change rate acquisition means 25 finds the change rate representing a change in the amount of the emitted light in accordance with the accumulated radiation dose in each of the areas, by using the information on the light emission change characteristic. The correction means 30 corrects a value of the image data obtained by reading the areas, by counterbalancing the change in the amount of the emitted light included in the image data, with reference to the light emission change rate for each of the areas found by the light emission change rate acquisition means 25.

It is preferable for the stimulable phosphor sheet 1 to comprise a stimulable phosphor having less change in the amount of the emitted light caused by the accumulated radiation dose. More specifically, the stimulable phosphor may be expressed by MeFX:$Eu^{2+}$ where X includes both Br and I, such as $BaF(Br_{0.5}I_{0.5}):Eu^{2+}$ and $BaF(Br_{0.85}I_{0.15}):Eu^{2+}$, for example. However, the stimulable phosphor may not necessarily have this composition.

Data of the light emission change characteristic to be stored in the light emission characteristic storage means 10 are obtained by measurement using a stimulable phosphor sheet produced in the same process as the stimulable phosphor sheet 1 and having the same composition as the stimulable phosphor sheet 1. The light emission change characteristic data obtained by the measurement are input to the light emission characteristic storage means 10 in advance.

The measurement can be carried out as follows, for example.

A plurality of the stimulable phosphor sheets are prepared in advance for measurement (hereinafter referred to as measurement stimulable phosphor sheets), and the surface of one of the measurement sheets is evenly irradiated with radiation from a radiography apparatus in such a manner that the accumulated dose of radiation per unit area becomes 100 mR (milli-Roentgen). In this manner, the measurement stimulable phosphor sheet whose accumulated radiation dose is 100 mR is generated. In the same manner, the measurement stimulable phosphor sheets whose accumulated radiation dose is 200 mR, 300 mR, . . . 1000 mR, . . . 2000 mR, . . . 3000 mR, . . . are prepared.

Energy of the radiation stored in the measurement stimulable phosphor sheets is then erased.

Radiography is carried out under the same conditions by using the measurement stimulable phosphor sheets having been subjected to the erasing and an unused measurement stimulable phosphor sheet whose accumulated radiation dose is 0 mR. In this radiography, the measurement sheets are evenly irradiated so that the radiation dose per unit area in the respective sheets becomes the same.

The radiation dose to be applied on the measurement sheets in the radiography is a radiation dose within an effective recording range of the sheets. In other words, the measurement sheets are irradiated with radiation within the sensitivity ranges of the measurement sheets which record radiographs The measurement sheets having been subjected to the radiography are then read by a reader under the same conditions, and image data are obtained that represent a value in accordance with an amount of the light emitted from each of pixels in the measurement sheets. In the reading, the light emitted from the measurement sheets is read within an effective range of reading sensitivity of the reader. In other words, the emitted light is detected within the sensitivity range of a photo detector in the reader.

The image data read from the measurement sheets are averaged, and one value of the image data is found for each of the measurement sheets. Thereafter, the image data found by the averaging are referred to as averaged image data.

The value of the averaged image data obtained from the measurement sheet whose accumulated radiation dose is 0 mR is referred to as D0, while the value of the averaged image data obtained from the measurement sheet whose accumulated radiation dose is 100 mR, 200 mR, 300 mR and so on is referred to as D100, D200, D300 and so on. A relative value of the amount of the emitted light refers to a relative value of the averaged image data D0, D100, D200, D300 and the like to the value of the averaged image data D0 as reference. In other words, the relative value of the amount of the light is D0/D0, D100/D0, D200/D0, D300/D0 and the like regarding the measurement stimulable phosphor sheet whose radiation dose is 0 mR, 100 mR, 200 mR, and the like.

The relative value of the amount of the emitted light can be found in the above manner for each of the accumulated radiation doses, and the light emission change characteristic data can be obtained for representing the change in the amount of the light emitted form each of the sheets in accordance with the accumulated radiation dose. FIG. 2 shows the light emission change characteristic data obtained by plotting a relationship between the accumulated radiation doses and the relative values of the amount of the emitted light for the respective measurement sheets in a coordinate system, whose vertical axis represents the relative value and whose horizontal axis represents the accumulated radiation dose (mR). As shown in FIG. 2, the amount of the light emitted from the sheets becomes smaller as the accumulated radiation dose becomes larger.

The stimulable phosphor sheets 1 are used in a radiation imaging/readout apparatus 200 having a radiography apparatus and a reader unified therein.

The cumulative radiation dose acquisition means 20 obtains information such as tube voltage, distance between a tube and the subject, an amount of the stimulating ray, the sensitivity of the photo detector detecting the emitted light, and the image data that have been obtained, from the radiation imaging/readout apparatus 200, whenever radiography is carried out by using the stimulable phosphor sheet 1. Based on the information (hereinafter referred to as radiation exposure history), the cumulative radiation dose acquisition means 20 obtains a radiation dose in each of the areas in the stimulable phosphor sheet 1, and adds up the radiation dose for each of the areas at each time of radiography to find the accumulated radiation dose.

As a method of finding the accumulated radiation dose, the following method can be used, for example.

The cumulative radiation dose acquisition means 20 has cumulative radiation dose storage means inside thereof. When the correction of the present invention is carried out, the cumulative radiation dose acquisition means 20 obtains the accumulated radiation dose by reading the cumulative radiation dose stored in the cumulative radiation dose storage means.

The cumulative radiation dose acquisition means 20 finds the radiation dose on the sheet at the time of radiography as will be described later from the image data that have been read from the sheet and have been subjected to the correction, and adds the radiation dose to the accumulated radiation dose before the radiography, stored in the cumulative radiation dose storage means. The value obtained by the addition is newly stored as the accumulated radiation dose in the cumulative radiation dose storage means.

Figure 3:
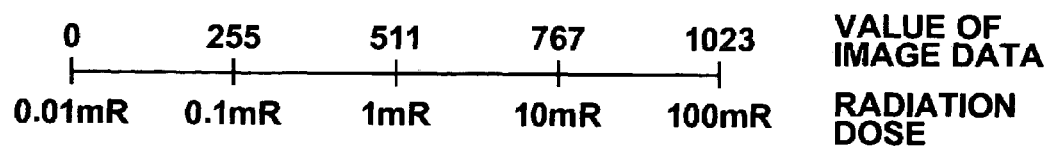
FIG. 3 shows a relationship between a radiation dose and a value of image data.

The value of the image data output from the reader using the photo detector (a photoelectric converter) by detecting the light emitted from the sheet upon exposure to the stimulating ray basically depends on the radiation dose on the sheet, strength of the stimulating ray, and the sensitivity of the photo detector. The radiation exposure history is not considered here. However, an output from a photo detector used in a radiography system using a stimulable phosphor sheet is generally designed to obtain image data of a predetermined value when the sheet without radiation exposure history is exposed to a predetermined amount of radiation, by correcting sensitivity of the photo detector and strength of a stimulating ray upon shipment from a manufacturer. A relationship between the radiation dose and the image data value is shown in FIG. 3.

The correction in the present invention refers to correction of the value of the image data, obtained by radiography using the sheet having the radiation exposure history, to a value of the image data that would have been obtained in radiography using a sheet without radiation exposure history. In other words, the value of the image data having been subjected to the correction has been corrected for one-to-one correspondence with the radiation dose (at each time of radiography) on each of the pixels in the sheet corresponding to the image data.

The areas R1, R2 and the like stored in the section storage means 15 correspond to the pixels when the stimulable phosphor sheet 1 is read by the radiation imaging/readout apparatus 200. The cumulative radiation dose acquisition means 20 finds the radiation dose in each of the areas as the radiation dose on each of the pixels, and finds the accumulated radiation dose by the addition of the radiation dose. In the case where each of the areas stored in the section storage means 15 comprises an area including a plurality of pixels, the cumulative radiation dose acquisition means 20 obtains the radiation dose for each of the areas as an averaged value of the radiation dose for the respective pixels therein, and finds the accumulated radiation dose by the addition of the radiation dose. The position and the range of each of the areas are input externally to the section storage means.

Operation of this embodiment will be described next.

After completion of radiography by the radiation imaging/readout apparatus 200 using the stimulable phosphor sheet 1, the cumulative radiation dose acquisition means 20 obtains the information from the radiation imaging/readout apparatus 200, and finds the accumulated radiation dose at this point for each of the areas in the sheet.

The light emission change rate acquisition means 25 obtains the accumulated radiation dose from the cumulative radiation dose acquisition means 20, and finds the light emission change rate according to the accumulated radiation dose in each of the areas R1, R2 and the like, with reference to the light emission change characteristic data stored in the light emission characteristic storage means 10.

The radiation imaging/readout apparatus 200 thereafter carries out subsequent radiography using the stimulable phosphor sheet 1. The stimulable phosphor sheet 1 emits the light Ke upon exposure to the stimulating ray Le from the radiation imaging/readout apparatus 200, and the radiation imaging/readout apparatus 200 detects the light Ke to output the image data representing the radiograph recorded in the sheet 1.

The correction means 30 obtains the image data output from the radiation imaging/readout apparatus 200, and corrects the value of the image data caused by the change in the amount of the emitted light included in the image data obtained from the areas R1, R2 and the like, with reference to the light emission change rate found by the light emission change rate acquisition means 25 for the divided areas R1, R2 and the like, and with reference to the position and the range of each of the areas stored in the section storage means 15.

More specifically, in the case where the accumulated radiation dose in one of the areas is 1000 mR, a light emission change rate $\alpha$ is found to be 0.95 for an accumulated radiation dose H of 1000 mR in the area, based on FIG. 2. A value QL (QL1, QL2, QL3 and so on) of the image data corresponding to each of the pixels in the areas is then corrected by using the light emission change rate $\alpha=0.95$. Since the value of the image data has been obtained by a logarithm amplifier and an A/D converter as a digital value through processing of an analog signal detected in 1024 levels, the correction can be carried out by the following equation:

$$QL_{correct} = QL - 1024 \times \mathrm{Log}_{10} \alpha$$

where QL is the value of the detected image data before the correction and $QL_{correct}$ is the value obtained by the correction.

In the case where the light emission change rate a becomes a predetermined value or lower, an error of the correction described above is expected to become large. Therefore, a warning lamp 41 blinks.

By correcting the value of the image data obtained by reading each of the areas in the above manner, an effect of shading in accordance with the accumulated radiation dose can be corrected regarding the radiograph obtained from the stimulable phosphor sheet that is used repeatedly for radiography.

In the embodiment described above, the correction has been described regarding the image data read from the sheet used repeatedly by the radiation imaging reading apparatus. However, the same correction can be carried out regarding a stimulable phosphor sheet contained in a cassette used by a radiography system comprising a plurality of radiography apparatuses and a plurality of readers, for example.

Figure 4:
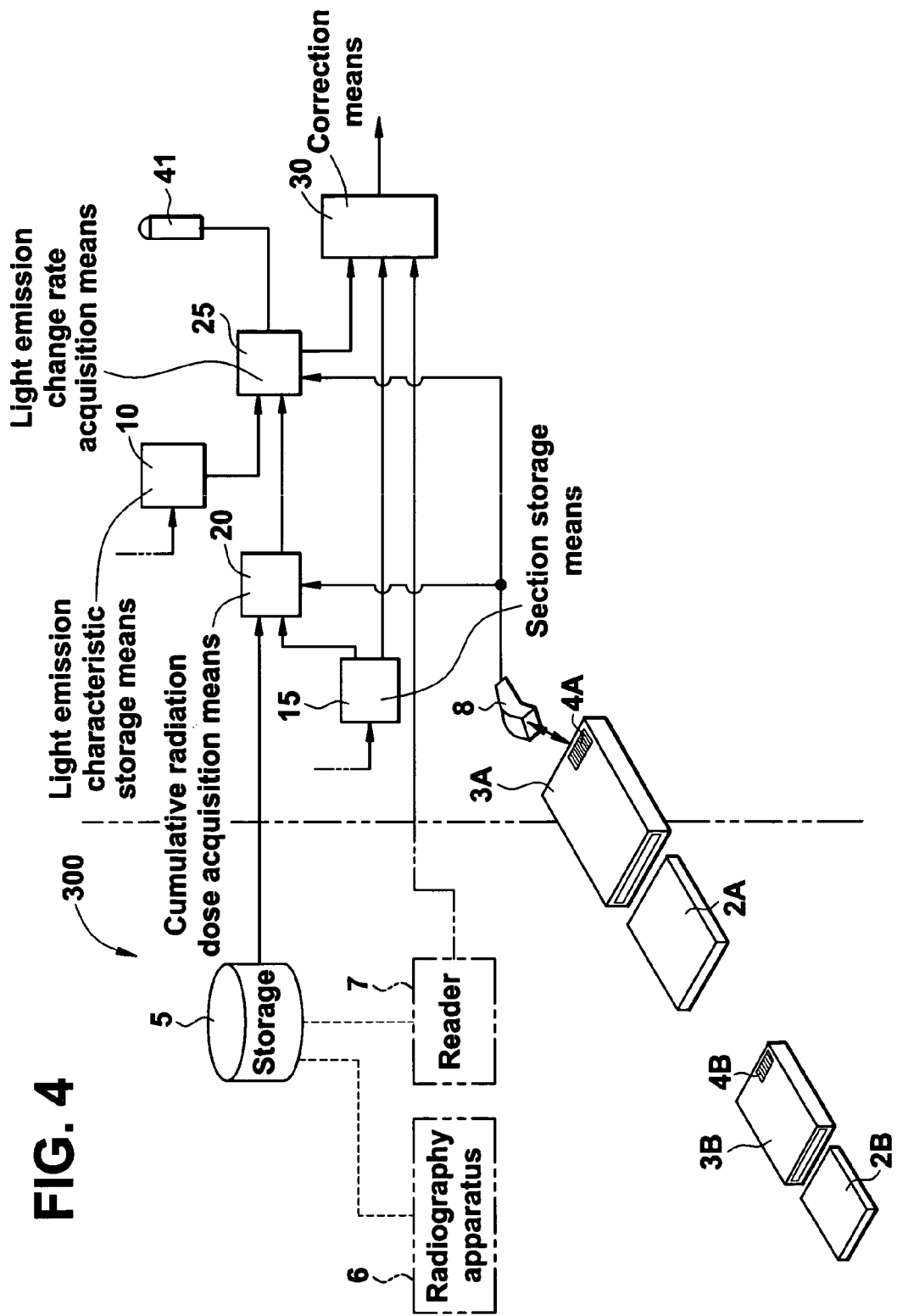
FIG. 4 shows the configuration of an image data correction apparatus of the present invention adopted in a radiography system using a cassette.

In such a case, a plurality of stimulable phosphor sheets are used in a radiography system 300, and each of the sheets is used by the different radiography apparatuses or readers. Therefore, as shown in FIG. 4, a bar code 4A, 4B, and so on is attached to each of cassettes 3A, 3B, and so on that respectively store stimulable phosphor sheets 2A, 2B, and so on in order to distinguish the sheets from each other. In addition, the radiation exposure history regarding each of the sheets (that is, the information on tube voltage at the time of radiography, the amount of stimulating ray at the time of reading, sensitivity of a photo detector that detects light, and obtained image data) is stored in a large-capacity storage 5. Furthermore, the light emission characteristic storage means 10 stores the light emission change characteristic data input thereto for each of the sheets, and the section storage means 15 stores the position and the range of each of the areas in each of the sheets input thereto.

When correction is carried out on the image data, which have been obtained through radiography by a radiography apparatus 6 and have been read from a specific one of the sheets (such as the sheet 2A) by a reader 7, the cumulative radiation dose acquisition means 20 obtains the position and the range of each of the areas in the sheet 2A from the section storage means 15 with reference to information represented by the bar code 4A of the sheet 2A read by a bar code reader 8. The cumulative radiation dose acquisition means 20 also obtains the radiation exposure history of the sheet 2A from the large-capacity storage 5 for obtaining the accumulated radiation dose for each of the areas.

The light emission change rate acquisition means 25 then finds the light emission change rate according to the accumulated radiation dose for each of the areas in the sheet 2A obtained from the cumulative radiation dose acquisition means 20, by using the light emission change characteristic data of the sheet 2A stored in the light emission characteristic storage means 10, with reference to the information represented by the bar code 4A.

Thereafter, the correction means 30 corrects the value of the image data obtained from each of the areas by counterbalancing the change in the amount of the light, by using the light emission change rate for each of the areas.

In order to store the radiation exposure history, large storage rapacity is necessary. Therefore, a size of each of the areas may be set larger by inclusion of a plurality of pixels in each of the areas. In this case, the space necessary for storing the history can be reduced by storing one set of the radiation exposure history for each of the areas. For example, if the size of each of the areas is changed from 100 µm×100 µm, which is the size for one pixel, to 1 mm×1 mm comprising 100 pixels, the space necessary for the storage can be reduced to 1/100.

The means for distinguishing each of the stimulable phosphor sheets may be semi-conductor memories or the like, instead of the bar codes.

The space necessary for storing the radiation exposure history can also be reduced by thinning the pixels in the radiograph. In this case, the pixels are thinned after averaging processing, median filtering processing, or mode filtering processing is carried out on the image data. In this manner, the value of the image data can be obtained more appropriately.

The image data correction method and the image data correction apparatus may be applied to a radiation therapy apparatus used for treatment by exposing a lesion to radiation. In this case, the stimulable phosphor sheet is used for radiography for recording a radiograph of the lesion exposed to high-energy radiation. The radiation dose on the sheet becomes large at each time of radiography in this case, and the change in the image data value becomes large due to the change in the amount of the light emitted by exposure to a stimulating ray. Therefore, the effect of the correction can be apparent.

Figure 5:
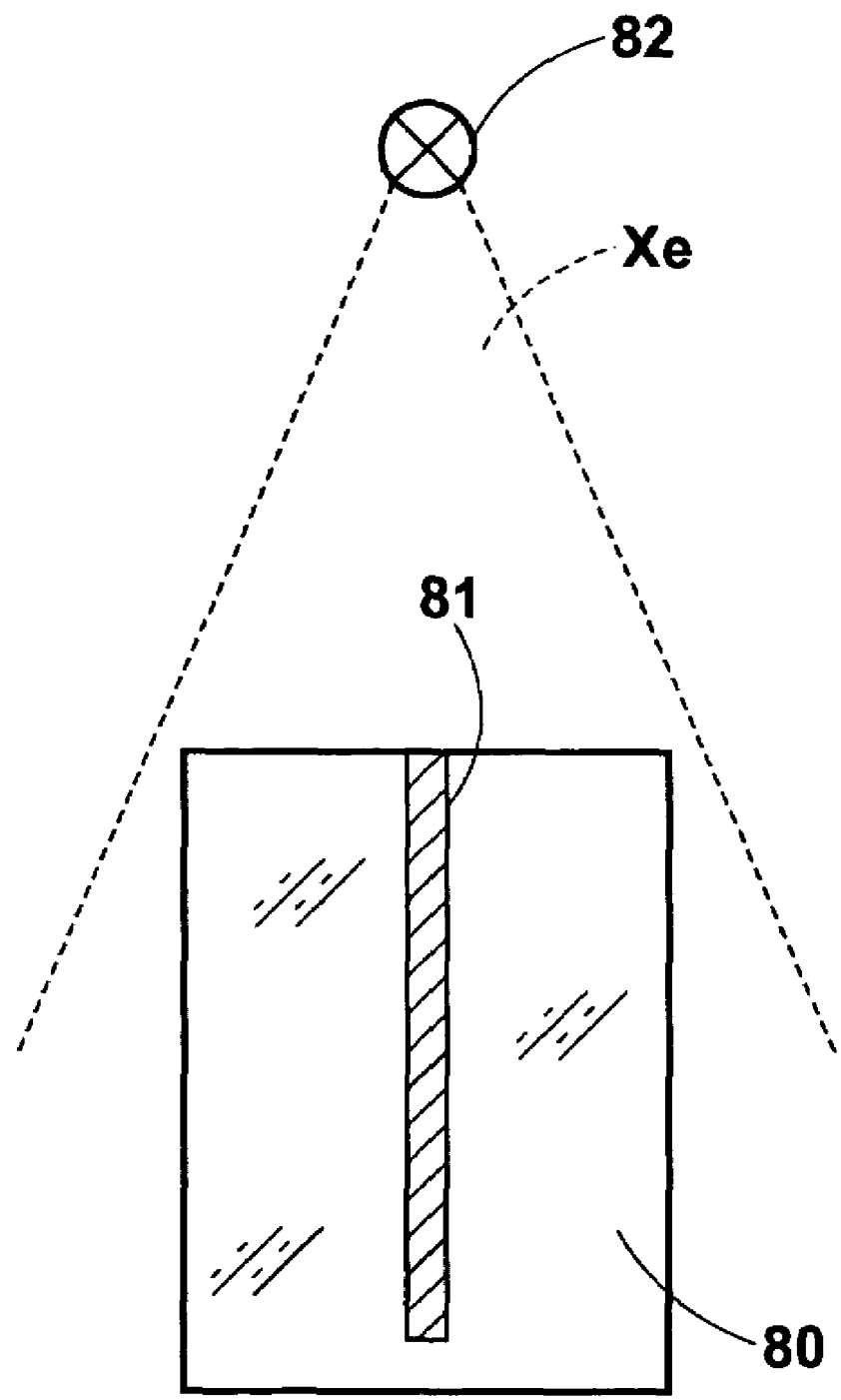
FIG. 5 shows an example of using a stimulable phosphor sheet in radiography in radiation therapy.

In radiography for radiation therapy, a stimulable phosphor sheet 81 may be soaked in some cases in water or an acrylic phantom 80, as shown in FIG. 5. Radiography is then carried out by placing the sheet 81 in such a manner that the direction along the thickness of the sheet 81 becomes perpendicular to the direction of propagation of radiation Xe emitted from a radiation source 82. In this case, the correction can also be carried out.

A program for causing a computer to execute the image data correction method in the above-described embodiment is the program of the present invention.

What is claimed is:

1. An image data correction method for correcting image data representing a radiograph recorded in and read from a stimulable phosphor sheet used repeatedly in radiography, the image data correction method comprising the steps of:

preparing light emission change characteristic data representing a change, according to an accumulated dose of radiation on the stimulable phosphor sheet, in an amount of light emitted from the stimulable phosphor sheet having been exposed to a stimulating ray in advance;

obtaining an accumulated dose of radiation in each of areas generated by dividing a light emission surface of the sheet;

finding a light emission change rate representing a change in the amount of the light in each of the areas corresponding to the accumulated dose of radiation thereon, by using the light emission change characteristic data; and correcting a value of the image data for each of the areas obtained by reading thereof, by counterbalancing the change in the amount of the light included in the image data, with reference to the light emission change rate.

2. An image data correction apparatus for correcting image data representing a radiograph recorded in and read from a stimulable phosphor sheet used repeatedly in radiography, the image data correction apparatus comprising:

light emission characteristic storage means for storing light emission change characteristic data representing a change, according to an accumulated dose of radiation on the stimulable phosphor sheet, in an amount of light emitted from the stimulable phosphor sheet having been exposed to a stimulating ray;

section storage means for storing a position and a range of each of areas in the sheet obtained by dividing a light emission surface of the sheet;

cumulative radiation dose acquisition means for obtaining an accumulated dose of radiation in each of the areas;

light emission change rate acquisition means for finding a light emission change rate representing a change in the amount of the light in each of the areas corresponding to the accumulated dose of radiation thereof, by using the light emission change characteristic data; and correction means for correcting a value of the image data for each of the areas obtained by reading thereof, by counterbalancing the change in the amount of the light included in the image data, with reference to the light emission change rate.

3. The image data correction apparatus according to claim 2, wherein each of the areas is an area occupied by each pixel corresponding to the image data in the light emission surface of the stimulable phosphor sheet.

4. The image data correction apparatus according to claim 2, wherein each of the areas is an area comprising a plurality of pixels in the light emission surface of the sheet corresponding to the image data.

5. The image data correction apparatus according to claim 2, wherein the stimulable phosphor sheet comprises a stimulable phosphor expressed by MeFX:Eu2' where Me includes at least one of Ba, Sr, and Ca while X refers to a halogenic composition including both Br and I.

6. A computor readable medium storing a program for correcting image data representing a radiograph recorded in and read from a stimulable phosphor sheet used repeatedly in radiography, the program causing a computer to execute:

receiving information representing an accumulated dose of radiation in each of areas in the stimulable phosphor sheet obtained by dividing a light emission surface of the sheet;

finding a light emission change rate representing a change in an amount of light emitted from each of the areas in accordance with the accumulated dose of radiation by using light emission change characteristic data prepared in advance for representing a change, according to an accumulated dose of radiation on the sheet, in the amount of the light emitted from the stimulable phosphor sheet having been exposed to a stimulating ray; and correcting a value of the image data for each of the areas obtained by reading thereof, by counterbalancing the change in the amount of the light included in the image data, with reference to the light emission change rate.

* * * * *